Figure 1:
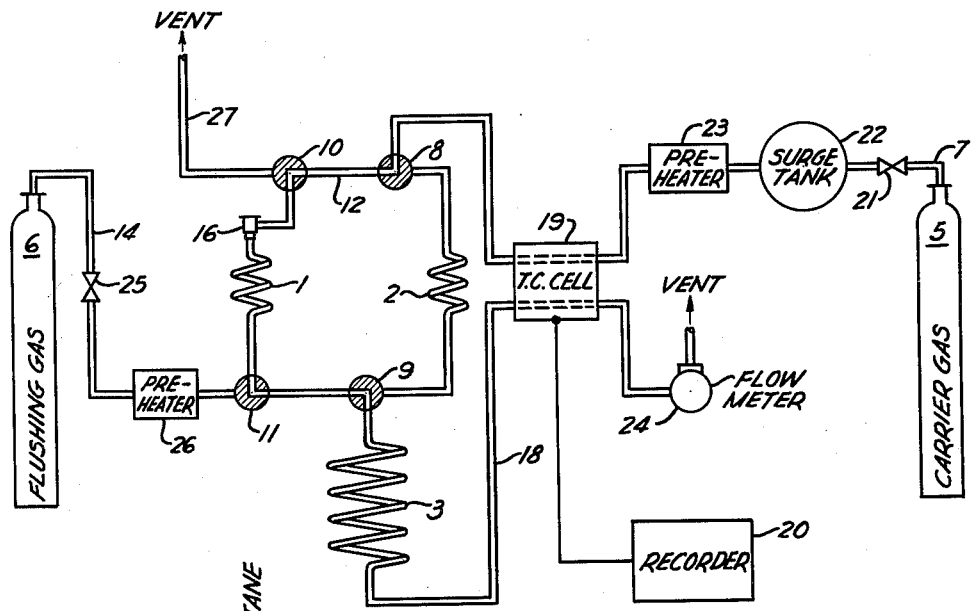

April 24, 1962 D. H. LICHTENFELS 3,030,798
CHROMATOGRAPHIC PROCESS AND APPARATUS
Filed Nov. 2, 1956

INVENTOR.
DEAN H. LICHTENFELS
BY
HIS ATTORNEY

United States Patent Office 3,030,798
Patented Apr. 24, 1962

3,030,798
CHROMATOGRAPHIC PROCESS AND
APPARATUS
Dean H. Lichtenfels, Pittsburgh, Pa., assignor to Gulf
Research & Development Company, Pittsburgh, Pa., a
corporation of Delaware
Filed Nov. 2, 1956, Ser. No. 620,054
9 Claims. (Cl. 73—23)

This invention relates to a method and an apparatus for separating fluid mixtures and more particularly to an improved analytical method and apparatus for separating a fluid mixture by partition chromatography in order to identify components of the mixture.

The technique of separating fluid mixtures by gas-liquid partition or thin-film chromatography has been developed in recent years for analyzing small samples of fluid mixtures. The method has been described in the article by Lichtenfels et al., Analytical Chemistry, volume 27, No. 10, October 1955, pages 1510–13 and in the references cited therein. In analyzing a volatile mixture by gas-liquid partition chromatography a small sample of the mixture is injected into the end of a long narrow column filled with inert granular solid particles on which have been deposited a thin film or coating of a high-boiling organic liquid such as dioctyl phthalate. The column is eluted with an inert carrier gas such as helium or hydrogen. Components of the mixture then begin to partition between a gas phase in the interstitial spaces of the column and a liquid phase formed by the high-boiling organic solvent coating of the granular solid particles. This causes the components of the mixture to move through the column with individual velocities which are less than that of the carrier gas. The velocity with which each component moves is dependent upon its partition coefficient, the latter being a measure of the solubility of the component in the stationary liquid phase. Since different compounds have different partition coefficients, the components of the mixture move through the column at different speeds and, if the column is long enough, they emerge one by one from the column, usually in the order of boiling points for a homologous series of compounds. The emerging components are detected by suitable means for detecting vapor concentration in a gas stream. The most commonly used detecting means and the most suitable for the method of my invention is a thermal conductivity cell connected with a recording potentiometer. The plot of potentiometer deflection against time provides a quantitative and qualitative analysis of the mixture.

The prior are method of analysis by partition chromatography has been valuable for many uses but has disadvantages in some separations. Thus, in analyzing only those components of a multi-component mixture which are readily eluted from a partition chromatography column by a carrier gas, a considerable length of time may be required to remove the remaining components from the column in order to restore it to its original condition for the next analysis. For example, if it is desired to analyze precisely only the $C_4$–$C_6$ hydrocarbons of a gasoline sample, these hydrocarbons can be carried through a long partition chromatography column in a period of less than an hour. However, to remove the rest of the gasoline range hydrocarbons can require many hours, for example, 20 hours or more. Similarly, if a crude oil is analyzed for light hydrocarbons, they will emerge from the column in a reasonably short time, but it may require many days to remove the rest of the crude oil. As a practical matter it may be impossible to remove all of the heavy components of the crude with carrier gas alone. Therefore, if a column used for such separations is used in subsequent runs, the heavy components remaining in the column from previous runs will continue to emerge slowly from the column and will make it difficult or impossible to analyze accurately the light components.

A method and apparatus which avoid these problems have been described in the patent application of N. D. Coggeshall, Serial No. 553,571, filed December 16, 1955, now Patent No. 2,868,011. This application describes a novel procedure in which a fluid mixture is introduced into a first partition column, a carrier gas then being flowed through the first column. The effluent from the first column is then passed through a second chromatographic column and the flow of gas from the first column is continued until after the last of the light components which are to be separated in the second column have been eluted from the first column. Thereafter, and before the first of the heavy components which are to be excluded from the second column appears in the effluent from the first column in substantial amount, the flow from the first column into the second column is stopped and the carrier gas is passed into the second column without passage through the first column. The carrier gas and successively emerging light components of the feed mixture are recovered as effluent from the second column. This procedure makes it possible to use the second partition chromatography column for a large number of separations in such a manner that the column does not become fouled by heavy materials which pass through slowly.

The present invention provides a further improvement in the improved chromatographic process and apparatus described in the above patent application. The process and apparatus of my invention make it possible to use the same first and second chromatographic columns for a large number of separations in which only the easily elutible components of a mixture are to be analyzed.

The process of the invention in general comprises injecting a fluid mixture into a first partition chromatographic column containing granular solid particles having a surface coating of a partitioning liquid and flowing an inert carrier gas through the first column. The effluent from the first column is passed into a second chromatographic column also containing granular solid particles having a surface coating of a partitioning liquid. The flow of carrier gas through the first column is continued until all components to be separated in the second column have emerged from the first column. Thereafter, and before a predetermined heavy component of the feed mixture begins to appear in the effluent from the first column in substantial amount, the flow of effluent from the first column into the second column is discontinued and the carrier gas is passed directly through the second column without passage through the first column. A stream of flushing gas is then flowed into said first column in a direction of flow opposite to the previous direction of flow of the stream of carrier gas. The flow of the stream of carrier gas through the second column is continued until all desired light components have emerged from the second column. The back flow of the stream of flushing gas through the first column is discontinued and thereafter carrier gas flow through the first column and second column in series in the original direction of flow is resumed and another charge of fluid mixture to be separated is injected into the first column.

The apparatus of the invention in general comprises a first partition column, a parallel by-pass conduit, a second partition column in series relationship to the first column and the by-pass conduit, a source of carrier gas and a source of flushing gas. In one modification of the apparatus the source of flushing gas may be the same as the source of carrier gas. The first partition column and the second column contain a body of granular solid particles coated with a partitioning liquid and the by-pass conduit has substantially the same resistance to gas flow as the first column. Valves adapted to direct fluid flow along either of two different paths are provided at the upper and lower ends of the first column and at the upper and lower ends of the by-pass conduit. A line is provided to pass carrier gas from the source of carrier gas through the valve at the upper end of the by-pass conduit and then to the valve at the upper end of the first column and into the first column. A line is also provided to pass flushing gas from the source of flushing gas to the valve at the lower end of the first column. The first column is provided with a means for introducing the charge mixture and the second column is provided with a line for withdrawing carrier gass and components of the charge mixture. The apparatus is provided with means for detecting vapor concentrations in gas streams. In the preferred apparatus this means is a thermal conductivity cell having a reference channel communicating with the carrier gas line between the source of carrier gas and the by-pass conduit and a testing channel communicating with the effluent line from the second column.

The method and apparatus of the invention make possible rapid separation and identification of the readily elutible components of a mixture, for example, the light components of gasolines or other petroleum fractions. For convenience I will refer to the more readily elutible components of a mixture as the light components or light fraction, but it should be understood that low molecular weight is not always an indication that a material will be more readily eluted than higher molecular weight materials.

When the method and apparatus of the invention are used for analyzing the light fraction of mixtures such as gasolines the first column acts as a preliminary fractionating column to separate the light fraction and the second column provides a complete analysis of this fraction. The heavier components retained in the first column are prevented from interfering with the light components in subsequent runs by back-flushing the first column with a flushing gas while the second chromatographic separation of the light fraction is in progress.

Figure 2:
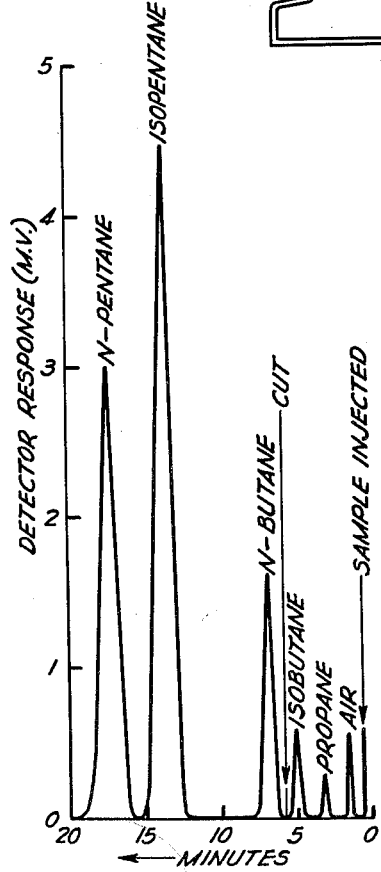

Further explanation of my invention will be made by referring to the drawing of which:

FIGURE 1 is a schematic diagram of one embodiment of the apparatus of my invention in which the process of the invention can be carried out; and FIG. 2 is a chromatogram or a plot of thermal conductivity cell response versus time for the analysis of a gasoline.

The apparatus of FIGURE 1 comprises a first partition column 1, column 2 which serves as a by-pass conduit, and the second partition chromatographic column 3. Columns 1 and 2 are arranged in parallel flow with respect to each other and in series with the second column 3. As the drawing shows, the second column 3 has greater capacity than the first column. In the modification of the drawing it is in the form of a long coiled tube.

Columns 1 and 3 are packed with a permeable body of granular solid particles having a surface coating of a high-boiling solvent, which is referred to as a "partitioning liquid." Column 2, which is the by-pass conduit of the apparatus, may be filled with the same permeable solid material or with any other packing that will give column 2 the same flow resistance as column 1. In lieu of a packed column such as column 2, the by-pass conduit may be any other form of conduit having a flow resistance equal to that of column 1.

The apparatus is provided with a carrier gas source and a flushing gas source. In the apparatus of the drawing separate sources of carrier gas and flushing gas are provided in the form of carrier gas cylinder 5 and flushing gas cylinder 6. It is also possible, however, for the source of carrier gas and the source of flushing gas to be a common source, for example, in the form of a single tank of inert gas. A carrier gas line 7 connects the carrier gas cylinder via intermediate elements of the apparatus with the upper end of column 1 and the upper end of column 2. Column 2 has at its upper end a valve 8 which is adapted to direct fluid flow along either of two different paths. A similar valve 9 is provided at the lower end of column 2 and similar valves 10 and 11 are provided at the upper and lower ends respectively of column 1. Carrier gas line 7 delivers carrier gas to the valve 8 which can direct the flow of gas either to valve 10, via the carrier gas line extension 12 or directly into the by-pass column 2.

The flushing gas cylinder 6 is connected through intermediate means such as pressure regulating valve 25 and preheater 26 with valve 11 at the lower end of column 1.

Column 1 is provided with means for introducing the charge mixture. In the apparatus of the drawing this charge inlet means takes the form of a puncturable, self-sealing, rubber cap 16, such as the self-sealing caps used on serum bottles, into which a small sample of a mixture to be analyzed is injected by means of a hypodermic micro-syringe. The second column 3 is provided at its lower end with an effluent line 18 for withdrawing carrier gas and components of the charge mixture.

The apparatus is also provided with means for detecting vapor concentrations in gas streams. In the preferred apparatus this means is a thermal conductivity cell 19. The thermal conductivity cell has a testing channel through which the effluent from column 3 is passed via line 18 and a reference channel through which carrier gas from the carrier gas source is passed via line 7. The thermal conductivity cell is connected with a recording potentiometer 20 which continuously plots potentiometer deflections against time. This plot can be used for a qualitative and quantitative analysis of the lighter components of the feed mixture.

I have mentioned that carrier gas line 7 and flushing gas line 14 pass their gas streams to the partition columns via intermediate elements of the apparatus. As FIGURE 1 shows, line 7 passes the carrier gas through a pressure reducing valve 21, a surge tank 22 and a preheater 23. Thermal conducivity cells are sensitive to changes in flow rates and temperature, and to obtain uniform results from the cell these conditions must be maintained constant. The pressure or flow control valve 21 serves to maintain a constant carrier gas pressure. In a preferred embodiment of the apparatus, two control valves are provided in the gas line, one of which reduces the gas pressure from the high pressure of the gas cylinder approximately to the desired pressure for the process and the other of which is a needle valve downstream from the first valve which provides a fine adjustment of the pressure and flow rate. The surge tank 22 provides a means to smooth out pressure disturbances which result from turning the various valves of the apparatus during an analysis as will be described more fully. The preheater 23 heats the carrier gas to the desired process temperature. The preferred form of the apparatus is provided with the means to maintain constant temperature. Preferably, this is a constant temperature air bath, not shown in the drawing, which encloses the partition columns, the thermal conductivity cell and the valves. The air bath is equipped with a temperature controller, a circulating fan and a heater which maintain the apparatus at the desired constant temperature. The pressure control valve 25 and the preheater 26 in flushing gas line 14 perform functions similar to those of the corresponding elements in line 7. A flow meter such as the wet gas meter 24 of FIGURE 1 is provided in the preferred apparatus as a means for measuring the gas flow rate and ensuring that constant flow has been maintained.

The manner in which the apparatus of FIGURE 1 is used in the method of the invention will be explained by describing the analysis of a particular liquid mixture. The liquid mixture is an unstabilized reformed gasoline having a gravity of 51.8° API and a boiling range from 112° to 380° F. It contains approximately 91% by weight hexanes and heavier hydrocarbons and the rest lighter hydrocarbons. The quantitative and qualitative analysis of the n-pentane and lighter components of the gasoline is carried out by the method of the invention as described in the example below.

*Example*

In the apparatus used for the analysis, column 1 is a coil one foot in length of ¼ inch O.D. copper tubing (approximately 3/16 inch I.D.). Column 3 is a similar coil of tubing but is seven feet in length. Columns 1 and 3 are filled with particles of crushed insulating fire brick screened to 40–80 mesh and coated with approximately 30% by weight of dioctyl phthalate. Valves 8, 9, 10 and 11 are set in the positions shown in FIGURE 1. Helium, employed as the carrier gas, is introduced from the carrier gas tank 5. The helium passes via line 7 through the pressure regulating valve 21, set to maintain a constant flow rate of 30 ml. per minute. The gas passes through preheater 23 where it is heated to 45° C., then through the reference channel of cell 19, and then to valve 8. Valve 8 is initially set as shown in the drawing to direct the flow of carrier gas through the carrier gas line extension 12 to valve 10, which is initially set as shown in the drawing to direct the flow of carrier gas into column 1. The gas then passes through valve 11 which is initially set, as shown in the drawing, to direct the flow to valve 9. The valve 9 is initially set to direct the flow into the second column. After equilibrium has been established with carrier gas passing through the system, the electrical bridge of the thermal conductivity cell is balanced and the base line for the pen of recorder 20 is established. Before charging the gasoline sample to the apparatus, valve 10 is turned to momentarily shut off the flow of carrier gas. This also vents the column to atmospheric pressure to prevent loss of sample during charging. Using a micro-syringe, a 0.02 ml. sample of the gasoline to be analyzed is injected into column 1 through the self-sealing rubber cap 16. Valve 10 is then turned to allow carrier gas to flow into column 1. The flow of carrier gas through columns 1 and 3 in series is continued until substantially all of the n-pentane and lighter components have been eluted from column 1. In the operation described, this requires approximately 4.5 minutes. Then valves 8 and 9 are turned and the carrier gas is passed through columns 2 and 3 in series for approximately twenty more minutes to elute the n-pentane and lighter components from column 3. While carrier gas is being flowed through the by-pass column 2, the valves 11 and 10 are turned to cause flushing gas, which is helium in this example, to flow through column 1 in the direction opposite to the original direction of flow of carrier gas. The back-flushing of column 1 is continued for a somewhat longer time than the period of 4.5 minutes during which column 1 was on stream for the flow of carrier gas in the original direction and the volume of flushing gas used is somewhat greater than the volume of carrier gas passed through column 1. This causes the heavier materials which are retained relatively close to the charge inlet end of column 1 to be substantially completely removed at the end of the column through which they were originally introduced. The flushing gas and heavy material are vented from the system via line 27. Following this back-flushing period, column 1 is in condition for receiving another charge of gasoline to be analyzed. Then, after the light fraction is completely removed from column 3, another gasoline sample can be analyzed with no interference by heavy components from the first analysis.

FIGURE 2 of the drawing shows a chromatogram of the pentane and lighter components which are separated from the gasoline charge mixture as described in the example above. This chromatogram is produced by the recording potentiometer 20 of FIGURE 1 and is a continuous plot of the signal from the thermal conductivity cell in millivolts versus time of elution in minutes. From previous calibration data for retention times in the chromatographic column of the various gasoline range hydrocarbons it is determined that the charge mixture contained propane, isobutane, n-butane, isopentane and n-pentane. Heavier components are retained in the first chromatographic column 1. The concentration of each eluted component is calculated from the area under the peaks of the chromatogram. The peak areas can be determined with a planimeter or by multiplying peak heights by the half-band widths. The line marked "cut" in FIGURE 2 indicates the time that the flow of carrier gas through column 1 was discontinued and switched to the by-pass column 2.

The advantages of my invention lie in the fact that many rapid analyses such as described above can be made without replacing the first partition column. It is possible to obtain accurate analyses of the light components of a gasoline fraction or other wide boiling rang fluid mixture in the short time required for removing the light components from the second chromatographic column and yet the subsequent analyses are not adversely affected by the undesired elution of heavy components from previous runs. It has been possible, with my method and apparatus, to analyze the light ends of hundreds of gasoline samples having end points as high as 400° F., using the same first column or preliminary fractionating column and the same second column and no change in the retention times of the light components being analyzed has been apparent.

The particular column lengths and diameters described in the example are merely illustrative. However, it is advantageous in most separations for the second column to have relatively greater capacity than the first column. In the apparatus of the drawing, the first and second columns have the same diameter but the first column is considerably shorter. The time required to elute the light components from the short first column is considerably less than is required to elute them completely from the longer second column during the precise fractionation which takes place therein. If the flow rates and temperatures of the flushing gas and carrier gas are the same, the time required to remove the heavy fraction from the first column by back-flushing can be the same length of time that the first column was on stream to the flow of carrier gas during the initial separation of the light fraction from the heavy fraction. Ordinarily, the back-flushing of the short first column can be completed considerably before the removal of the light components from the long second column has been completed. If necessary, the back-flushing can be accomplished even more rapidly by using a more rapid flow rate and/or a higher temperature for the flushing gas than for the carrier gas. Whether or not the same or different flow rates are used for the flushing gas and carrier gas, in order to remove the heavy material completely from the first column, the volume of flushing gas used should at least equal the volume of carrier gas passed through the column and, preferably, should be substantially greater.

The time for switching the flow of carrier gas from the first column to the by-pass column or conduit can be determined in different ways. Normally, there will be an interval of time between the elution from the first column of the last portion of a particular component and the first portion of the next heavier component. For instance, when a gasoline fraction is analyzed for hydrocarbons in the $C_4$—$C_5$ range, there will be a substantial period after the tail end of the last $C_5$ compound and before the head end of the first $C_6$ compound emerge from the first column. The length of time after injecting the charge when this interval occurs will be known after experience with the particular type of mixture and, therefore, at the predetermined time after injecting the charge the flow of carrier gas can be switched from the first column to the second column. The switching of the valves at the predetermined time can be done manually or can be accomplished through the use of a timing device which actuates a valve operating means. It is also possible to use a continuous analyzing control means for determining when to switch the flow of carrier gas. Such a means can be placed between the first column and the second column to detect the emergence of a component which it is not desired to pass into the second column in substantial amount. The flow of carirer gas can then be switched either manually or automatically when the undesired heavy component first begins to appear in the effluent from the first column.

I have used an unstabilized gasoline as an example of a mixture which can be separated or analyzed by the process of the invention. It should be understood, however, that the process can be applied advantageously to the separation or analysis of a great number of mixtures where it is desired to prevent the entry of the more strongly-held components of the mixture into the second chromatographic column.

In the example, I have described the use of the same granular material in the first column and in the second column. It is within the scope of the invention to use any of the granular materials known in the art for use in partition chromatography. Furthermore, either the same or different solid materials can be used for the first column and the second column. As a rule, the solid materials used for partition chromatography are nonporous, granular materials. Preferably they are not chromatographically active adsorbents, as otherwise the effects of adsorption chromatography and partition chromatography would be superimposed upon each other and this might prevent the obtaining of sharply defined fractions.

The partitioning liquid for coating the solid particles contained in the partition columns can be selected from the many solvents that are suitable for use in partition chromatography. The first and second columns can employ either the same or different partitioning liquids. In some instances one partitioning liquid may be superior to another for separating a particular mixture. The partitioning liquid is applied as a surface coating to a granular solid material. Liquids that are most suitable for partition chromatography include high-boiling organic solvents such as dioctyl phthalate, dinonyl phthalate, dioctyl sebacate, paraffin wax, silicone fluids, etc. It is also possible to use more volatile partitioning liquids (for example, water) if any such liquids have particularly desirable solvent properties. When using a volatile partitioning liquid the carrier gas should be saturated with its vapor so that the liquid will not be removed from the solids by the carrier gas.

Any of the inert gases known for use in partition chromatography can be used as the carrier gas or flushing gas in my process and either the same or different gases can be used for these two purposes. Examples of suitable carrier and flushing gases include hydrogen, helium, nitrogen, etc. Preferably a low molecular weight carrier gas is used when the detecting means used for the process is a thermal conductivity cell.

I have described a thermal conductivity cell with a recording potentiometer as a preferred means for analyzing the effluent from the second column. However, other known continuous analyzers with similarly high sensitivity can be also used in the process and apparatus of the invention.

In the description above and in the claims I have referred to "heavy" components and "lighter" components of the feed mixture and have indicated that the process of the invention prevents the fouling of the second partition column by such heavy components. The terms heavy and light are used for convenience to distinguish between components of a mixture which move slowly through a partition column and those which move more rapidly. In most mixtures, for example, in mixtures of a homologous series of compounds, the light components or lower molecular weight components will pass more rapidly through a partition column than the heavy or higher molecular weight components. This may not be true, however, of some mixtures of compounds of different molecular types. Therefore, it should be understood that, as used in this specification, a heavy component of a mixture is one which has a partition coefficient which favors retention of the component in the liquid phase of a partition column and results in slow movement of the component through the column while a light component is one which has a partition coefficient which favors its entry into the moving gas phase and thus results in more rapid movement of the component through the column.

Obviously, many modifications and variations of the invention as hereinbefore set forth may be made without departing from the spirit and scope thereof and therefore only such limitations should be imposed as are indicated in the appended claims.

I claim:

1. A method for separating components of a fluid mixture by partition chromatography which comprises introducing said mixture into a first partition column and flowing carrier gas through said column, passing the effluent from said first column into a second partition column each of said partition columns containing granular solid particles coated with a paritioning liquid, continuing the flow of carrier gas through said first column until sufficient time has elapsed for all components to be separated in said second column to have emerged from said first column, thereafter and before sufficient time has elapsed for a predetermined heavy component of the charge mixture to appear in the effluent from said first column, stopping the flow of effluent from said first column into the second column and passing said carrier gas through said second column without passage through said first column and passing a stream of flushing gas into said first column in a direction of flow opposite to the original direction of flow of the stream of carrier gas therethrough, and thence out of the column, recovering separated light components of the charge mixture from the second column with said carrier gas, continuing the flow of carrier gas through said second column until all light components introduced therein have been recovered, stopping the flow of flushing gas through said first column, thereafter introducing another charge of fluid mixture into said first column and resuming the flow of carrier gas through said first column and said second column in the original direction of flow.

2. A method for analyzing by partition chromatography the lighter components of a wide boiling range fluid mixture which comprises flowing a carrier gas at a constant rate and temperature in series through a first partition column and a second partition column, each of said partition columns containing granular solid particles coated with a partitioning liquid, injecting the fluid mixture into said first partition column, upon sufficient time having elapsed for all of said lighter components to have emerged from said first column and yet insufficient for the first undesired heavy component to commence emerging from said first column, thereupon discontinuing the flow of carrier gas through said first column, passing said carrier gas at the same constant rate and temperature in series through a by-pass conduit and said second column, said by-pass conduit having a gas flow resistance substantially equal to that of said first column and passing a stream of flushing gas into said first column in a direction of flow opposite to the original direction of flow of the by-passed stream of carrier gas, and thence out of the column, continuing the flow of flushing gas through said first column until substantially all remaining components of the fluid mixture are eluted therefrom at the end of the first column in which the fluid mixture was originally injected, recovering separated light components of the charge mixture and carrier gas as effluent from the second column, passing the effluent of said second column through a continuous analyzing means whereby to identify said lighter components as they emerge from said second column, continuing the flow of carrier gas through said second column until all light components introduced therein have been eluted therefrom, discontinuing the flow of flushing gas through said first column and of carrier gas through said by-pass conduit, therereafter injecting another charge of fluid mixture into said first column, and resuming the flow of carrier gas through said first column and said second column in series in the original direction of flow.

3. A method according to claim 2 in which said second column has substantially greater capacity than said first column and in which the volume of flushing gas flowed through said first column is at least equal to the volume of carrier gas flowed through said first column before the flow of carrier gas is passed to said by-pass conduit.

4. A method according to claim 2 in which said flushing gas is flowed through said first column at a more rapid rate and at a higher temperature than said carrier gas.

5. A partition chromatography apparatus which comprises a first partition column and a parallel by-pass conduit, a second partition column disposed in series flow relationship to the first column and the by-pass conduit, said first column and said second column containing granular solid particles coated with a partitioning liquid and said by-pass conduit having substantially the same resistance to gas flow as said first column, valves positioned at the upper and lower ends of the first column and at the upper and lower ends of the by-pass conduit, said valves being adapted to direct fluid flow along either of two different paths, a source of carrier gas, a carrier gas line passing from said source to the valve at the upper end of the by-pass conduit, an extension of said carrier gas line passing from said valve at the upper end of the by-pass conduit to the valve at the upper end of the first column, a source of flushing gas, a flushing gas line passing from said latter source to the valve at the lower end of the first column, means for introducing charge mixture to the upper end of said first column, a line for withdrawing effluent gas from the lower end of the second column and means communicating with said latter line for detecting vapor concentrations in gas streams.

6. A partition chromatography apparatus, comprising a carrier gas supply conduit, a flushing gas supply conduit, a first partition column having an inlet and outlet, said first column being provided with means for the introduction of a mixture to be separated near the inlet thereof, a second partition column having an inlet and an outlet, said carrier gas supply conduit being provided with valve means for selectively affording communication with the inlets of the columns, valve means for venting the inlet of the first column, valve means affording the outlet of the first column selective communication with the inlet of the second column and the flushing gas supply conduit, and means communicating with the outlet of the second column for measuring a physical property of the effluent of the second column.

7. A chromatographic apparatus which comprises a first chromatographic column and a parallel by-pass conduit, said first column being a partition chromatographic column and containing a stationary partitioning liquid, a second chromatographic column disposed in series flow relationship to the first column and the by-pass conduit, each of said columns having an inlet and an outlet, a carrier gas line and a flushing gas line, means near the inlet of said first chromatographic column for introducing into said first chromatographic column a mixture to be separated, valve means selectively communicating said carrier gas line with the inlet of said first column and with said by-pass conduit, valve means for selectively communicating the inlet of said second column with the outlet of said first column and with said by-pass conduit, valve means for communicating said flushing gas line with the outlet for said first column, means for venting flushing gas from the inlet of said first column, and a detecting means communicating with the outlet of said second column.

8. An improved method for chromatographic separation of a fluid mixture, comprising separating at least one relatively heavier component from the mixture by introducing a sample of said fluid mixture into a first chromatographic column and establishing a flow of carrier gas through said first column in a selected direction, and withdrawing from said first column an effluent comprising the carrier gas and the relatively lighter components of the fluid mixture that are not retained in the first column, then separating fluid mixture components in said effluent by passing said effluent into a second chromatographic column and establishing flow of the effluent carrier gas therethrough in a selected direction, continuing passage of the effluent from the first column into the second column until every component that is to be separated in the second column has emerged from the first column, thereafter, but before a predetermined component of the fluid mixture appears in the effluent from the first column, terminating flow of carrier gas through the first column and flow of effluent from said first column into said second column, and after such termination of flow, removing the components of the fluid mixture retained in the second column from that column by passing the carrier gas into the second column without previous passage through the first column and in a direction the same as that in which the effluent carrier gas from the first column was passed, and removing the components of the fluid mixture retained in the first column from that column by passing a flushing gas through said column in a direction opposite to the selected direction in which the carrier gas was originally passed, terminating the flow of flushing gas through the first column, thereafter introducing another charge of fluid mixture into the first column and resuming the flow of carrier gas through the first column and the second column in the original direction of flow.

9. A chromatographic apparatus comprising a first chromatographic separation column, having an inlet and an outlet, a second chromatographic separation column, having an inlet and an outlet, means for establishing serial flow of carrier gas from a source through said first and second columns in a forward direction, means for introducing a fluid sample to be analyzed into the inlet of the first column, means connected to the outlet of the second column for detecting changes in a physical property of the effluent from said second column, a by-pass conduit connecting the carrier gas source and the inlet of the second column, means for terminating flow of said carrier gas through said first column and means for establishing flow from said source through said by-pass conduit to the inlet of said second column, a flushing gas source, means for establishing flow of said flushing gas from said source through said first column in a direction opposite to that in which the carrier gas was passed, and thence out of the column.

References Cited in the file of this patent

UNITED STATES PATENTS

| | | |
|---|---|---|
| 2,398,818 | Turner | Apr. 23, 1946 |
| 2,868,011 | Coggeshall | Jan. 13, 1959 |

OTHER REFERENCES

Article: "Chromatographic Separations etc.," by Fairbairn and Harpur in Nature, vol. 166, Nov. 4, 1950, pages 789, 790. Copy in 73—23c.

Article: "Gas Chromatography Growing," in Chemical and Engineering News, vol. 34, No. 15, April 9, 1956, page 1695. Copy in 73—23c.